(12) United States Patent
Grootwassink

(10) Patent No.: US 7,031,705 B2
(45) Date of Patent: Apr. 18, 2006

(54) METHOD AND PROCESS FOR VALIDATING ROAMING CELLULAR USERS

(75) Inventor: David B. Grootwassink, Smyrna, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 266 days.

(21) Appl. No.: 10/762,713

(22) Filed: Jan. 21, 2004

(65) Prior Publication Data
US 2004/0152463 A1    Aug. 5, 2004

Related U.S. Application Data

(63) Continuation of application No. 09/659,149, filed on Sep. 11, 2000, now Pat. No. 6,725,037.

(60) Provisional application No. 60/153,434, filed on Sep. 10, 1999.

(51) Int. Cl.
*H04Q 7/20*    (2006.01)

(52) U.S. Cl. .................. 455/432.1; 455/411; 455/433; 455/435.1

(58) Field of Classification Search ............. 455/432.1, 455/432.3, 435.1, 410–411, 440, 433, 422.1; 379/220.01, 219, 221.02, 221.09

See application file for complete search history.

(56) References Cited

U.S. PATENT DOCUMENTS

| | | | | |
|---|---|---|---|---|
| 5,420,910 A | * | 5/1995 | Rudokas et al. | 455/410 |
| 5,555,551 A | * | 9/1996 | Rudokas et al. | 455/410 |
| 5,610,974 A | * | 3/1997 | Lantto | 455/433 |
| 5,857,153 A | * | 1/1999 | Lupien | 455/436 |
| 5,867,788 A | * | 2/1999 | Joensuu | 455/445 |
| 6,006,094 A | * | 12/1999 | Lee | 455/445 |
| 6,023,619 A | * | 2/2000 | Kaminsky | 455/411 |
| 6,035,198 A | * | 3/2000 | Wiehe | 455/445 |
| 6,041,231 A | * | 3/2000 | Suzuki | 455/435.1 |
| 6,058,301 A | * | 5/2000 | Daniels | 455/411 |
| 6,091,949 A | * | 7/2000 | Sanchez | 455/417 |
| 6,363,431 B1 | * | 3/2002 | Hammer et al. | 709/249 |
| 6,615,041 B1 | * | 9/2003 | Adamany et al. | 455/432.1 |
| 6,725,037 B1 | * | 4/2004 | Grootwassink | 455/432.1 |

FOREIGN PATENT DOCUMENTS

GB    2352932    *    2/2001

* cited by examiner

*Primary Examiner*—Joseph Feild
*Assistant Examiner*—Kamran Afshar
(74) *Attorney, Agent, or Firm*—Cantor Colburn LLP

(57) ABSTRACT

A process for validating a roaming user who seeks access to a communications network operated by a first service provider is provided. The process includes determining that the user is associated with a second service provider, requesting registration data for the user to the second service provider, and validating or invalidating the user based on the registration data from the second service provider, the registration data identifying a status of the user and whether authentication of the user is required to validate the user.

8 Claims, 2 Drawing Sheets

METHOD AND PROCESS FOR VALIDATING ROAMING CELLULAR USERS

RELATED APPLICATIONS

This application is a continuation of U.S. patent application Ser. No. 09/659,149, filed Sep. 11, 2000 now U.S. Pat. No. 6,725,037, the entire contents of which are incorporated herein by reference, which claims priority to, and incorporates by reference, provisional patent application Ser. No. 60/153,434 entitled "METHOD AND PROCESS FOR VALIDATING ROAMING, INTERNATIONAL CELLULAR USERS" filed on Sep. 10, 1999.

BACKGROUND OF THE INVENTION

People like to communicate. They do it over wires, transmitting their voices and data over a wire or line, using telephones and similar devices (facsimile, computer modem) that are present in our homes, offices, schools, businesses, etc. and that connect to the public switched telephone network (PSTN) through wireline (also referred to as landline). Humans also communicate via wireless. Wireless communications are transmitted through radio frequency (RF) technology. Wireless communications include other communications that are transmitted via cellular telephones, mobile telephones, car phones, personal communication service (PCS) units, pagers, Palmpilots™ and the like.

Communications, whether wired or wireless, are not free. People must pay for their use of the network, or the network operators will not have the money to run the network, improve the network, etc. Many people do not like to pay for their communications, however, and have devised many and devious ways of circumventing payment. The incentive to do so is especially high when the communicating person is "roaming" or using the facilities of a network in another service area that is served by a different service provider with whom the subscriber has no business relationship. When "roamers" or others using a network do not pay for that use, it is called fraud (although one could more clearly call this theft).

The present invention provides a process for validating roamers, particularly international roamers, in such a way as to decrease fraud. The process applies to cell phones and to PCS phones that operate under various standards, such as Advanced Mobile Phone Service (AMPS), Call Division Multiple Access (CDMA), Time Division Multiple Access (TDMA), etc. Nonetheless, the principals of the present invention may be applied to other communication devices operating under other standards with the appropriate reconfiguration.

General Description of Wireless Communication:

With a wireless unit, a subscriber (e.g., a person who obtains wireless communications service from a service provider) may make or receive communications, which term refers to any call, message, announcement or other exchange of data or information, whether analog or digital, that may be received on or transmitted from a wireless unit, whether a stand-alone unit or integrated into other devices. When a subscriber initiates a communication on a wireless unit, a base station serving a predetermined geographic area wherein the subscriber is located receives the communication. This area is called a cell. A base station usually serves only one or a few cells. Other base stations serve other cells of a larger service area, which encompasses the geographic area that includes all of the cells to which the carrier provides wireless communications services. The service provider typically operates a wireless communications network or system to provide wireless communications service to the geographic area. The wireless communications network or system includes the referenced base stations, and other elements such as mobile switching centers (MSCs), and other network elements referenced below. The wireless communications network also includes elements that interface with the wireline PSTN and other networks to provide communications between and among wireless or wireline devices.

Upon receipt of a communication from a wireless unit, the base station transmits the communication to a mobile switching center (MSC). An MSC in a wireless communications system may be analogized to a central office in the PSTN. The MSC further routes the communication as appropriate, possibly to and through the PSTN, the same wireless communications system, another wireless communications system, or combinations thereof.

In addition to making a call, a subscriber may receive a communication on his or her wireless unit from a caller. The caller communicates to the number associated with the subscriber's wireless unit, which is referred to herein as the mobile number of the wireless unit. The mobile number may be the mobile identification number (MIN) of the wireless unit. The communication is routed through the PSTN, other networks, and/or wireless communications systems until the communication reaches the MSC serving the subscriber's wireless unit. This MSC then further routes the communication to the wireless unit.

Roaming:

A wireless device is particularly useful to a person on the move. For example, you can use a wireless unit while driving. A service provider or carrier provides the wireless communications service to your mobile wireless unit. But a subscriber's mobility may take him out of the service area served by his service provider. If the new area is served by a different service provider with whom the subscriber has no business relationship, the subscriber is said to be "roaming" out of the home service area and is called a "roamer" in a visited service area. To provide a roamer with communications service, service providers have agreed to follow certain procedures in processing communications of each other's subscribers. Generally, the service provider for the visited system validates a roaming subscriber. Validation (as well as a related process called authentication) aims to minimize fraudulent use of wireless units.

As shown in FIG. 1, generally in validation, when a wireless unit initiates a communication in a visited service area, the visited system service provider attempts to find the wireless unit's identification (also referred to as registration information) in the visitor location register (VLR) of an appropriate MSC in the visited system (MSC-V). If the VLR lacks the required information, it queries the roamer's home location register ("HLR") in the roamer's home system via a registration notification "REGNOT" request, which includes the wireless unit's identification (e.g., mobile number, its electronic serial number (ESN), and/or mobile identification number (MIN)). Typically, if the roamer's service provider is domestic, the VLR sends the query directly to the HLR; if the roamer's service providers is a non-North American carrier, the REGNOT request is routed through a Service Control Point ("SCP") to the roamer's HLR.

The HLR examines the wireless unit's identification to determine if it is valid. If so, then the HLR validates the wireless unit with a message to the serving VLR in the visited system, with settings indicating whether the subscriber can be served at all or partially (e.g., calls to the subscriber allowed, but the subscriber cannot originate calls, or vice versa). After the serving VLR in the visited system receives that message, it lets the subscriber use the local network. The VLR of the serving MSC may then temporarily store the visiting wireless unit's information to validate the identity of the wireless unit rather than requesting validation from the home system again for the next call.

If the wireless unit is invalid, then the HLR of the home system informs the serving VLR in the visited system. After the serving MSC in the visited system receives the notification that the visiting wireless unit is invalid, the visiting wireless unit may be provided with an announcement denying service or other steps may be taken. Generally, the communication initiated by an invalid visiting wireless unit is not processed.

Sometimes an HLR does not answer the REGNOT request from the SCP, resulting in no responsive message from the SCP back to the VLR. This is rather rare in North American networks. As a result, North American networks and service providers generally program their VLRs to allow the roamer service even when getting back no response from the roamer's HLR.

Sometimes, however, a non-North American carrier serves a roamer that is roaming in North America. Connections among North American networks and the roamer's home network may be subject to more downtime for numerous reasons. As a result, non-North American roamers may generate more occasions where the roamer's HLR does not respond to a REGNOT request. In those situations, the VLR goes into a default "positive" mode that allows the international roamer full service, without even the requirement that the user of that handset provide a personal identification number ("PIN"). If, however, the roamer perpetrates a fraud on the carriers (e.g., the roamer's phone was stolen or his bills unpaid), either the visiting or home service providers will be forced to pay for the fraudulent charges incurred by the roamer. Fraud may be even more likely if the roamer is visiting internationally, since that person may be less concerned with paying the charge or getting caught and prosecuted. Generally, the convention has been for the roamer's home carrier to pay the bill. Home carriers do not like doing so, particularly if they are used to a default mode of denying service if no explicit authorization is received.

While the visited system's VLR could simply deny service to all international roamers, that would not allow the visiting system to capture necessary revenues from such roamers. Moreover, systems in other countries often provide reciprocity with North American carriers, an arrangement that would be discouraged if the North American service provider denied service to other international roamers. Accordingly, a need exists to prevent automatic authorization of international roamers, while still allowing appropriate such roamers the ability to access wireless services.

SUMMARY OF THE INVENTION

This invention aims to overcome the above problems by providing processes and methods for validating roamers. The invention precludes automatically authorizing service to roamers, while still allowing valid roamers to access the visited system's network. For instance, in a preferred embodiment, for roamers servied by selected service providers, where the selected service provider's HLR does not return a proper response to the validation request, service will be denied.

For a selected roamer, such as an international roamer, the process involves first receiving at the SCP the normal registration notification request from the VLR of the visited system. Automatically, and without waiting for a response from the selected roamer's HLR, the SCP instructs the VLR that the selected roamer's wireless unit is valid, but that the VLR should not authorize service preventing the VLR from going into the default mode that would otherwise allow service. Simultaneously, the SCP forwards the registration notification request to the roamer's HLR. If the HLR responds, the SCP instructs the VLR appropriately by sending a qualification directive ("QUALDIR").

The QUALDIR informs the VLR of the roamer's state. For instance, the roamer may be valid but need to use a Personal Identification Number ("PIN") to obtain service, in which case the VLR does nothing because the roamer needs personally to initiate that process. Alternatively, the roamer may be a "VIP" roamer for whom the home carrier does not require a pin. Or, the home carrier may opt to allow its valid home subscribers to roam without using a pin. In any event, the QUALDIR returns the appropriate information to the VLR, which allows or denies service accordingly. If the HLR does not respond or provides a garbled response, the SCP will send the VLR a registration cancellation message. Although not necessary to preclude the roamer from obtaining service, the registration notification message allows the VLR to clear its memory of the information about the roamer.

DETAILED DESCRIPTION OF THE DRAWINGS

Figure 1:
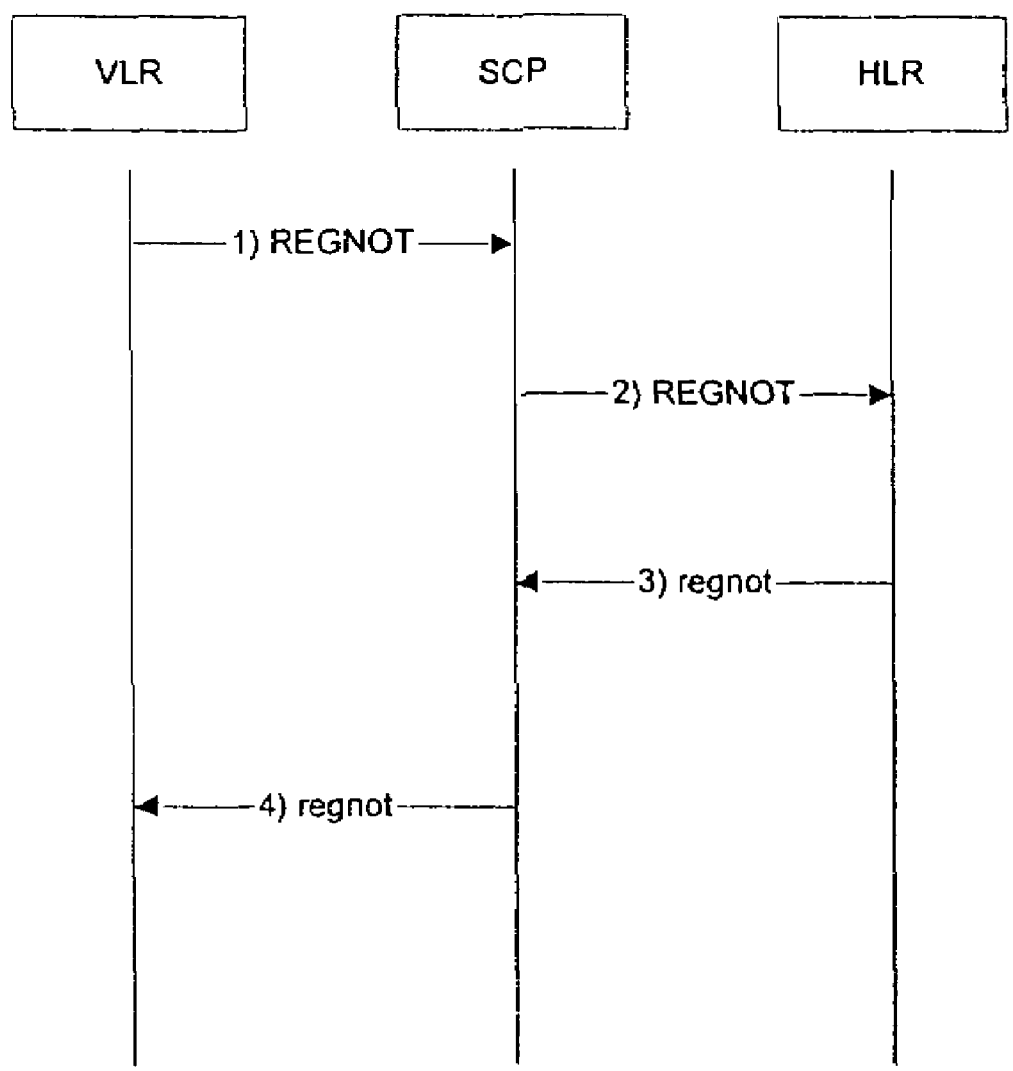
FIG. 1 shows the present process for validating international roamers via message interflow among the visited systems VLR, the SCP and the home system's HLR.

Before further describing a particular implementation of the present invention that is shown in the drawings, the following terms are explained, although more thorough understanding of the terms can be reached by resorting to this entire document. These term explanations are not intended to be conclusive, as technology will change and skilled persons will recognize other ways to implement the same functionality.

Selected Service Provider: This phrase refers to certain service providers to which the switch or SCP is instructed to apply the validation method of this invention. In one embodiment, a selected service provider may be a "non-national" service provider whose customers are roaming in another nation. In another embodiment a selected service provider may be a particular service provider who, for whatever reason, the network operator has decided to apply the validation method of this invention. By way of example, suppose BellSouth operates the network on which the customer seeks access. BellSouth has found that roamers from "Bob's Cell Phone Service" have an unusually high rate of fraud and that Bob's Cell Phone Service is in arrears in its repayments to BellSouth. BellSouth may decide that further use of its network by customers of Bob's Cell Phone Service require use of this method. In that event, BellSouth will program the appropriate network elements to identify roamers who are customers of Bob's Cell Phone Service and apply to those roamers the validation method described herein.

Validate: this term refers to the process of allowing a particular user to access a communications network. Validation includes authentication.

Validation data: refers to the data necessary to reach a conclusion as to whether a network should allow a user access. Such data includes authentication of the user's mobile phone number as well as user profile data indicating whether the user has paid bills, etc.

The present invention includes methods and apparatus for use in connection with wireless communications between foreign countries or systems. Exemplary embodiments of the present invention provide a method and/or apparatus that helps prevent fraud in wireless communications systems.

An exemplary embodiment of the present invention describes the process as carried out in a service control point (SCP), visitor location register ("VLR") or home location register ("HLR"). But the invention is not limited to these particular embodiments. As well as a stand-alone unit, the processes of this invention may be incorporated in or as part of another device such as an intelligent peripheral ("IP") in a wireless communications system or the process steps may be carried out in a single device or through the use of several devices.

Generally, to make and/or receive calls, a wireless unit must be registered, and if the wireless unit is located in a visited system, then the wireless unit must be registered with that visited system. Exemplary embodiments of the present invention provide for the registration of a roamer in a visited system particularly when the roamer is from a foreign country.

Figure 2:
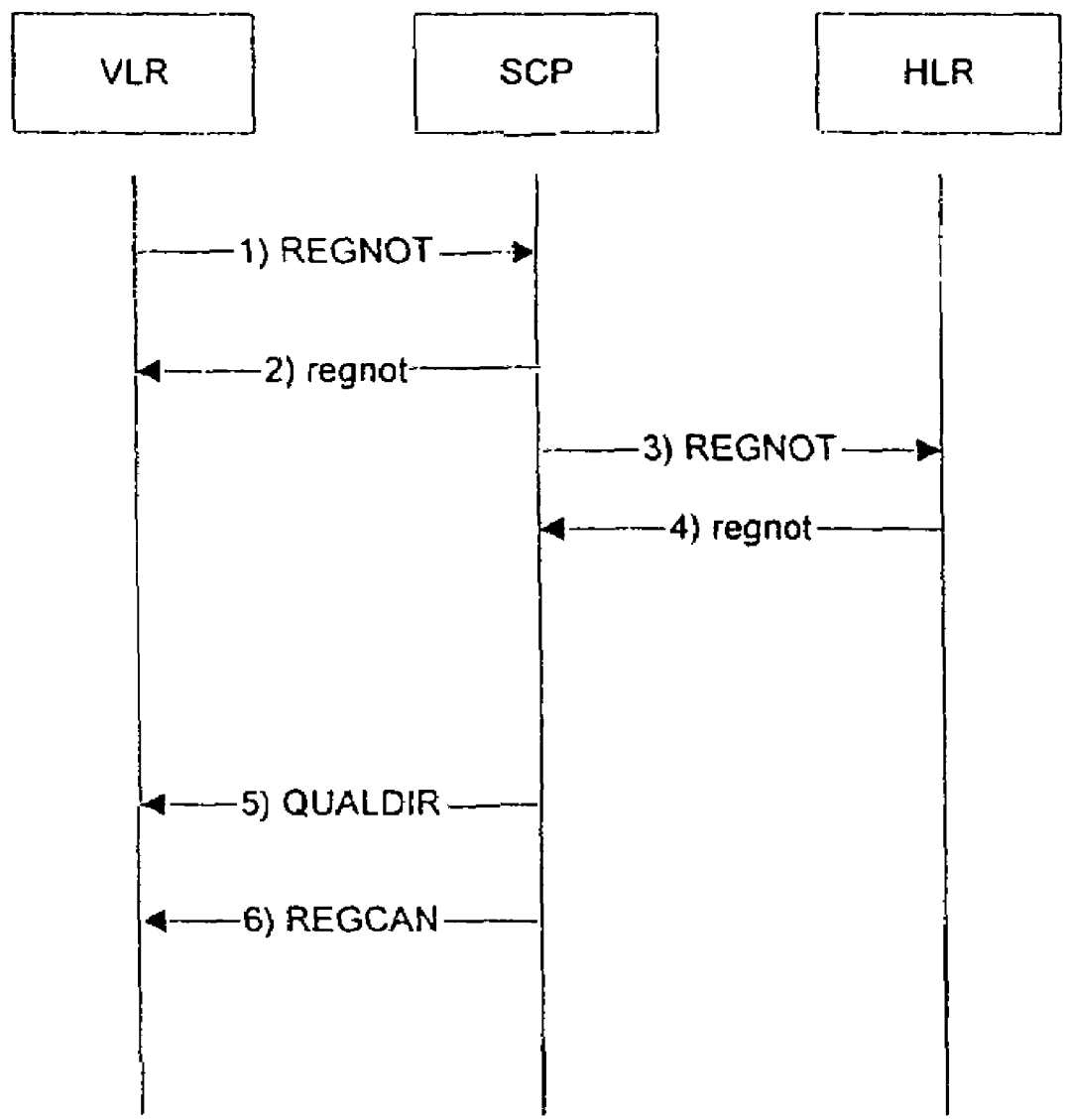
FIG. 2 shows the message interflow used by the present invention among the visited systems VLR, the SCP and the home system's HLR in order to preclude invalid roamers from automatically gaining service.

Assume Mr. Smith travels from Brazil to Miami, Fla. where he desires to use his wireless unit—normally served by a Brazilian carrier. Referring to FIG. 2, after Mr. Smith powers-on or turns on his mobile unit, at step 1 the mobile unit sends a registration request to a serving MSC (MSC-V) in the network that serves the Miami region. The MSC-V receives the registration information that is provided by the wireless unit that typically includes the ESN and MIN of the wireless unit. If the MSC-V does not find the wireless unit in its HLR or VLR and if the MSC-V determines a non-North American carrier serves the mobile number, the MSC-V forwards the registration information to a SCP. The SCP looks up the carrier associated with the wireless unit in order to forward the registration notification request to that carrier's HLR.

Based on that process, the MSC-V and SCP identify selected classes of roamers, such as an international roamer. This allows the SCP at step 2 automatically to return to the querying VLR a response to the registration notification request for certain selected subsets of roamers, such as international roamers. The response may act both as a holding message, giving the SCP time to route the registration notification message to the foreign carrier, and as a default denial of service if no response is received. Thus, the message may instruct the VLR that the roamer is valid but service cannot be granted.

Meanwhile, at step 3 shown in FIG. 2 the SCP forwards the original registration notification request to the roamer's home HLR. A REGNOT message generally contains a MIN, ESN, SID, MSCID, DPC, OPC, PIC code, authorization period, etc. Here, for Mr. Smith, that means the REGNOT request travels from the SCP serving Miami to his Brazilian service provider's HLR. Assuming the international connections allow the transfer of the request message to Brazil, step 4 shows that the return message validating or invalidating the roamer is sent back to the Miami SCP. If the subscriber is not a "VIP" subscriber who need not enter a PIN for roaming, or if the carrier does not allow terminations without use of a PIN, step 4 is the end of the validation message flow. If, however, the subscriber is a VIP or if the carrier allows termination without PIN entry, at step 5 the SCP then formulates and sends to the VLR a qualification directive ("QUALDIR") indicating the roamer's proper privileges.

Optionally, if the roamer's HLR does not respond—such as within a certain time period—or responds with an error, the SCP may also originate a registration cancellation ("REGCAN") message. That message is delivered to the VLR, which removes the wireless unit from the VLR's memory.

Alternatively, other classes of roamers could be identified by the MSC-V's VLR, which may be configured to deny service if no response to the registration notification is received for those other classes of roamers. For instance, the VLR may identify roamers associated with particular other service providers. Additionally, the present invention could be used simply to provide an automatic response for every roamer that requires the VLR to deny service, effectively changing the North American default rule that normally allows roamers to proceed even when their HLR does not respond.

This invention may also be deployed with other methods and systems for roamer fraud control. For instance, the present invention may be used with the Method and Systems for Providing Information to a Home System Regarding a Wireless Unit Roaming in a Visited System, described in U.S. patent application Ser. No. 09/359,515, filed Jul. 23, 1999, which application is hereby incorporated in its entirety by this reference. Also, as noted, the process of this invention may be performed by an SCP, VLR, or HLR, as well as other network elements of components.

What is claimed is:

1. A method for validating a roaming user who seeks access to a communications network operated by a first service provider, the process comprising:
   determining that the user is associated with a second service provider;
   requesting registration data for the user to the second service provider; and
   validating or invalidating the user based on the registration data from the second service provider, the registration data identifying a status of the user and whether authentication of the user is required to validate the user;
   wherein requesting registration data comprises requesting the registration data for the user within a predetermined period;
   wherein validating or invalidating the user comprises invalidating the user regardless of the result of the registration data from the second service provider when the registration data is not received from the second service provider within the predetermined period.

2. The method of claim 1, wherein said authentication is performed by the user entering a PIN.

3. The method of claim 1, further comprising instructing the network of the first service provider to cancel the user's registration when the user is invalidated.

4. The method of claim 1, wherein the registration data includes an authorization period of the user in the first service provider.

5. The method of claim 1, further comprising requesting a Personal Identification Number to the user before providing a service to the user, when the user is validated.

6. A method for validating a customer of an International or other selected service provider, where the customer is attempting to use a communications network comprising at least a Mobile Switching Center ("MSC") and Visitor Location Register ("VLR"), the process comprising:
- receiving registration notification data from a particular customer;
- determining whether the customer is associated with a selected service provider;
- formulating at a Service Control Point ("SCP") a request for registration notification to a Home Location Register ("HLR") of the customer;
- receiving at the SCP information pertaining to the customer's validation, including a status of the user and whether authentication of the user is required to validate the user; and
- forwarding from the SCP to the VLR either customer validation data or a request to cancel the customer's registration within the VLR;
- wherein receiving at the SCP information pertaining to the customer's validation comprises receiving at the SCP information pertaining to the customer's validation within a predetermined time period;
- wherein forwarding from the SCP to the VLR either customer validation data or a request to cancel the customer's registration within the VLR comprises forwarding the request to cancel the customer's registration with the VLR when the SCP does not receive the information within the predetermined time period.

7. The method of claim 6, wherein said authentication is performed by the user entering a PIN.

8. The method of claim 6, further comprising requesting a Personal identification Number to the customer before providing a service to the customer, when the SCP forwards to the VLR the customer validation data.

* * * * *